United States Patent [19]

Sims

[11] Patent Number: 5,704,672
[45] Date of Patent: Jan. 6, 1998

[54] STAND-UP SNOW SHOVEL WITH FLEXIBLE AUXILIARY HANDLE

[76] Inventor: Alan M. Sims, 255 Boretz Rd., Colchester, Conn. 06415

[21] Appl. No.: 635,980

[22] Filed: Apr. 22, 1996

[51] Int. Cl.⁶ ............................................. B25G 1/04
[52] U.S. Cl. ........................ 294/58; 294/54.5; 16/114 B
[58] Field of Search .......................... 294/54.5, 57–59, 294/153, 156; 16/114 R, 114 B, 124–126

[56] References Cited

U.S. PATENT DOCUMENTS

| | | |
|---|---|---|
| 911,291 | 2/1909 | Byor ............................................. 294/58 |
| 2,521,441 | 9/1950 | Bickley .......................................... 294/58 |
| 4,200,324 | 4/1980 | Helton ........................................... 294/58 |
| 4,531,713 | 7/1985 | Balboni ........................................ 294/54.5 |
| 5,472,252 | 12/1995 | Barone ........................................... 294/58 |

FOREIGN PATENT DOCUMENTS

| | | | |
|---|---|---|---|
| 1446837 | 12/1966 | France ........................................... 294/58 |
| 1533014 | 11/1978 | United Kingdom ....................... 294/58 |

*Primary Examiner*—Dean Kramer
*Attorney, Agent, or Firm*—M. P. Williams

[57] ABSTRACT

A snow shovel having a conventional blade (10) and handle (13) includes an auxiliary handle (18) tethered to the shovel by means of a resilient and/or flexible cord (19). The cord may be a folded bungee cord, the ends (20, 21) of which are secured to holes (30, 31) in the blade by means of hooks (28, 29) on the ends of the cord. A pliable tubing (33) may contain the bungee cord ends.

6 Claims, 2 Drawing Sheets

STAND-UP SNOW SHOVEL WITH FLEXIBLE AUXILIARY HANDLE

TECHNICAL FIELD

This invention relates to a snow shovel having a second, auxiliary handle flexibly tethered near the base of the first handle stem.

BACKGROUND ART

For some people, shoveling snow is either painful or impossible because it cannot be undertaken without at least some bending of the lower back. In an attempt to make a snow shovel which may be used while standing erect, a second, auxiliary handle has been joined to the stem of the main handle of a snow shovel, at various positions along the handle. In U.S. Pat. No. 5,411,305, a rigid second handle is pivoted horizontally to the main handle near the upper edge of the shovel blade. However, the auxiliary handle in said patent pivots only in the plane perpendicular to the shovel blade. This renders it essentially useless since the shovel cannot readily be turned for dumping the snow off the side thereof without the auxiliary handle traversing an arc as the shovel blade is rotated toward a vertical position, which is extremely cumbersome.

DISCLOSURE OF INVENTION

Objects of the invention include provision of a snow shovel which is easy to use while in a fully erect position.

According to the present invention, a snow shovel has a second, auxiliary handle which is tethered by a flexible longitudinally resilient cord to the shovel near the base of the main handle stem and the upper edge of the shovel blade. In further accord with the present invention, the auxiliary handle is tethered to the shovel by means of a bungee cord.

The present invention allows a very smooth shoveling motion, since the main handle can be rotated to alter the position of the blade with respect to vertical, without requiring specific motion of the auxiliary handle. The provision of a resilient cord for tethering the auxiliary handle to the shovel provides a very smooth shoveling motion, since the cord can yield during the insertion of the shovel blade into the snow, and responds with a retracting motion as the snow is lifted so as to permit stabilizing the load with respect to the user at the end of a blade-loading stroke. The invention also makes it very easy to unload the snow from the blade by dumping it in any fashion, as would be the case in a single-handled shovel.

Other objects, features and advantages of the present invention will become more apparent in the light of the following detailed description of exemplary embodiments thereof, as illustrated in the accompanying drawing.

BEST MODE FOR CARRYING OUT THE INVENTION

Figure 1:
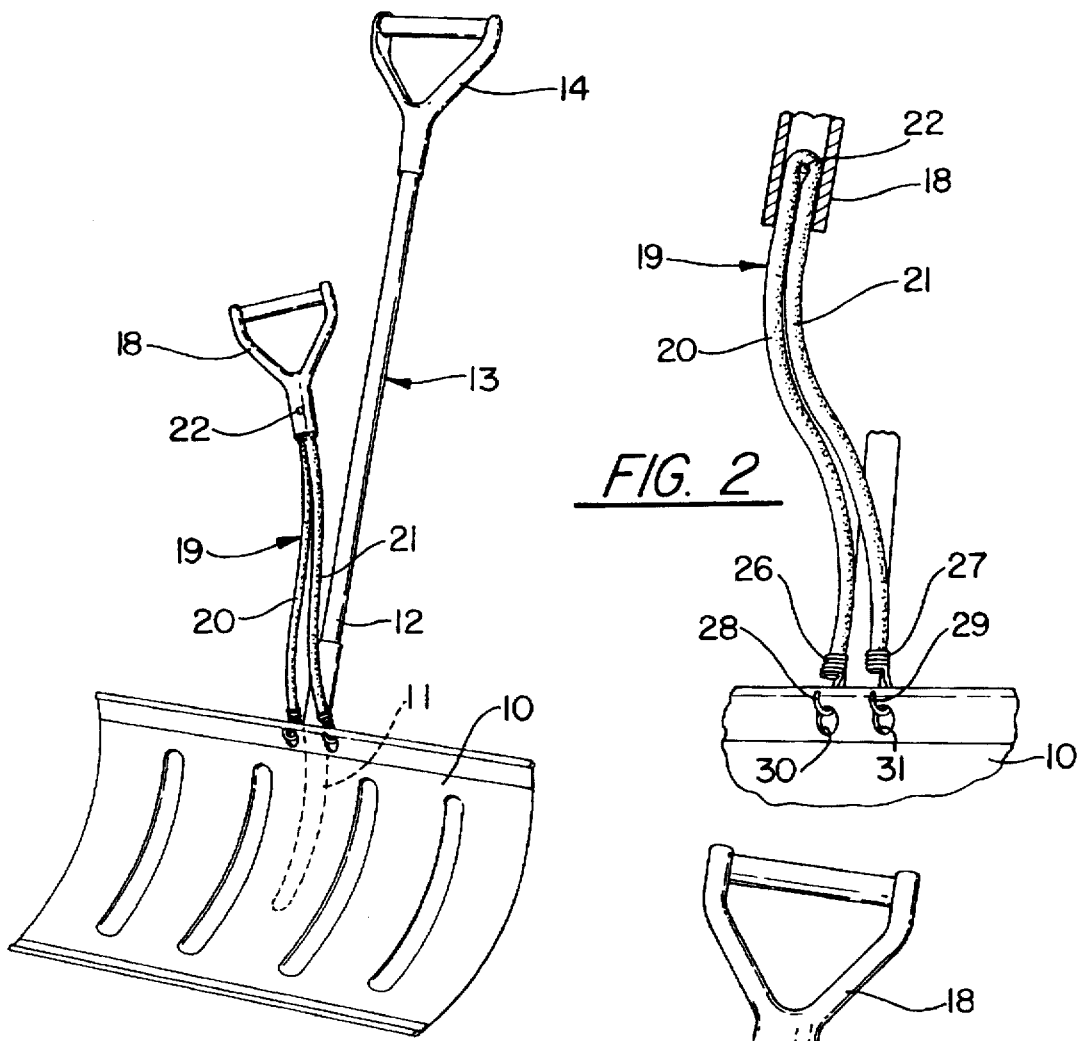
FIG. 1 is a perspective view of a snow shovel in accordance with the present invention.

Referring now to FIG. 1, a snow shovel according to the invention includes a blade 10 which may have a socket 11 for receiving the stem 12 of a main handle 13 that includes a handpiece 14, all as is known in the prior art.

Figure 2:
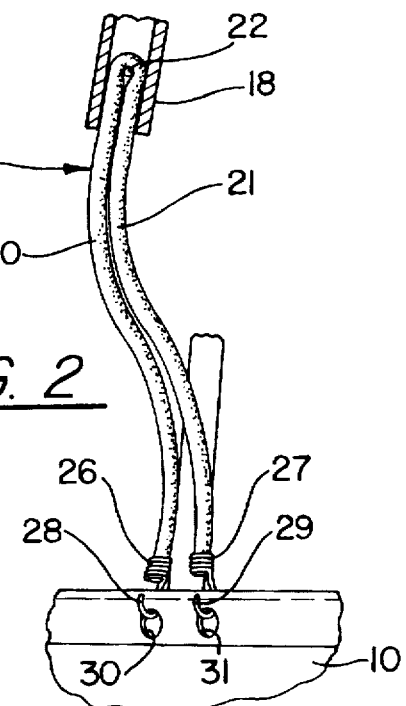
FIG. 2 is a partial, partially sectioned detail view of the tether in the shovel of FIG. 1.
Figure 3:
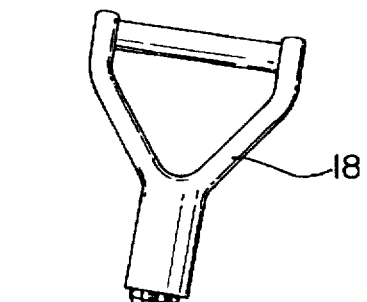
FIG. 3 is a partial, detailed view of another feature of the tether of FIG. 1.
Figure 3:
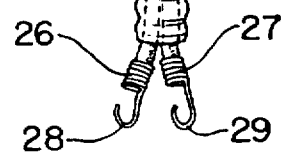
Figure 6:
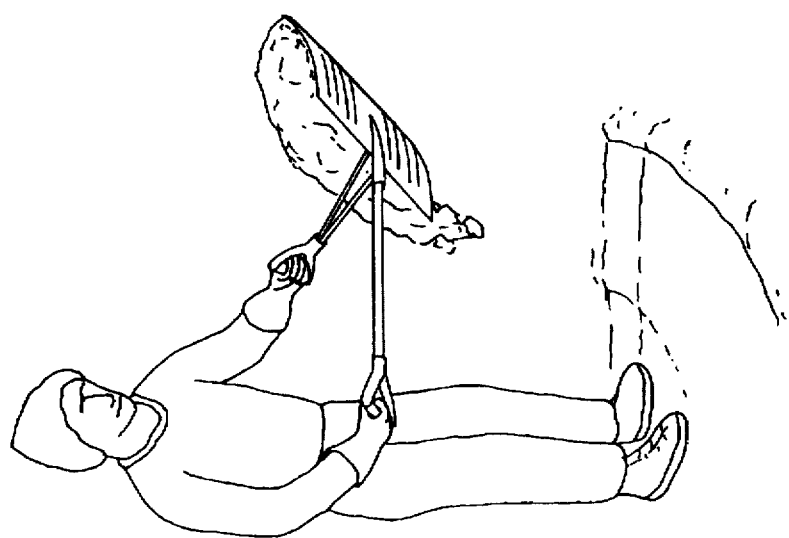
FIG. 6 is a stylized view illustrating the end of a shoveling stroke with the invention.
Figure 5:
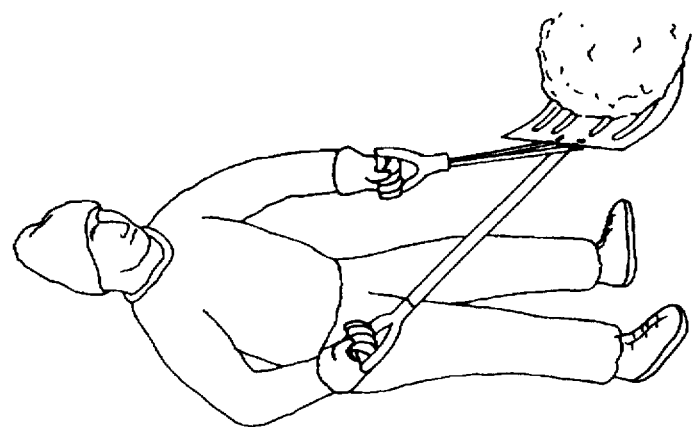
FIG. 5 is a stylized view illustrating the middle of a shoveling stroke with the invention.
Figure 4:
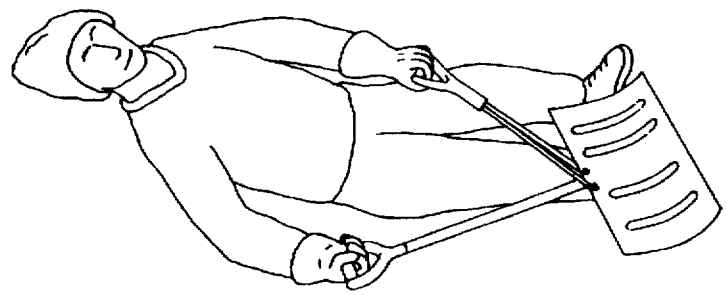
FIG. 4 is a stylized view illustrating the beginning of a shoveling stroke with the invention.

In accordance with the present invention, an auxiliary handle 18 is tethered to the blade 10 by a flexible cord 19 which, in the present embodiment, is also resilient since it comprises two halves 20, 21 of a single bungee cord. As seen more clearly in FIG. 2, the bungee cord 19 may be folded around a pin or bolt 22 within the handle 18. Each half 20, 21 of the bungee cord is terminated in a spiral crimp 26, 27 having a hook 28, 29, thereon, all in the usual fashion. The hooks 28, 29 extend through related holes 30, 31 in the blade 10. Not shown in FIGS. 1 and 2, the bungee cord 19 may be sleeved with a pliable plastic tubing 33 as seen in FIG. 3, so as to contain the two ends 20, 21 in a compact manner. The pliable tubing 33 should be loose enough to allow the bungee cord 19 to stretch and contract easily.

It has been found that forming the cord 19 by folding standard bungee cord of about ½ inch diameter works quite well. However, in its very broadest sense, the use of a flexible tether (cord 19) to secure the auxiliary handle 18 to the shovel may include use of one or more strands of rope, which may have little or no resilience. But the best shoveling action is achieved with a resilient tether, and such is preferred.

Although shown as a folded-over bungee cord, the cord 19 may be made of a single bungee cord of suitable strength. The embodiment herein simply uses the hooks normally found on readily available bungee cords to pass through holes in the blade, but the cord 19 may be fastened to the shovel in other ways. Although in this embodiment the cord 19 is fastened to the blade of the shovel, it may, instead, be fastened to the stem 12 near the blade 10 in any suitable fashion. All such details are irrelevant to the present invention which comprises the use of an auxiliary snow shovel handle which is secured to the shovel by a flexible tether which is resilient.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

I claim:

1. A snow shovel having a blade and a main handle characterized by the improvement comprising:

an auxiliary handle secured to the shovel near the juncture of said handle with said blade by means of a longitudinally resilient flexible cord.

2. A snow shovel according to claim 1 wherein said cord comprises a bungee cord having a hook crimped to each end, said bungee cord folded back upon itself around a pin extending through said main handle, said hooks engaging the edge of said blade adjacent said main handle.

3. A snow shovel according to claim 2 including a pliable tubing surrounding said bungee cord between said blade and said auxiliary handle.

4. A snow shovel having a blade and a main handle characterized by the improvement comprising:

an auxiliary handle resiliently tethered to said snow shovel by a bungee cord near a point where said handle joins said blade.

5. A snow shovel according to claim 4 wherein said cord comprises a bungee cord having a hook crimped to each end, said bungee cord folded back upon itself around a pin extending through said main handle, said hooks engaging the edge of said blade adjacent said main handle.

6. A snow shovel according to claim 5 including a pliable tubing surrounding said bungee cord between said blade and said auxiliary handle.

* * * * *

UNITED STATES PATENT AND TRADEMARK OFFICE
CERTIFICATE OF CORRECTION

PATENT NO. : 5,704,672
DATED : Jan. 6, 1998
INVENTOR(S) : Alan M. Sims

It is certified that error appears in the above-identified patent and that said Letters Patent is hereby corrected as shown below:

Column 2, line 56, "main" should read --auxiliary--.
Column 3, line 4, "main" should read --auxiliary--.

Signed and Sealed this

Twenty-second Day of June, 1999

Attest:

Q. TODD DICKINSON

*Attesting Officer*   *Acting Commissioner of Patents and Trademarks*